US006607126B2

(12) United States Patent
Altini et al.

(10) Patent No.: US 6,607,126 B2
(45) Date of Patent: Aug. 19, 2003

(54) METHOD FOR COLLECTING DATA FROM ELECTRONIC VOTING UNITS

(76) Inventors: Giovanni Altini, Via Tolosano, 48 48018 Faenza (IT); Sergio Sangiorgi, Via Castellani, 22 48018 Faenza (IT)

( * ) Notice: Subject to any disclaimer, the term of this patent is extended or adjusted under 35 U.S.C. 154(b) by 0 days.

(21) Appl. No.: 10/117,168

(22) Filed: Apr. 8, 2002

(65) Prior Publication Data

US 2002/0158124 A1 Oct. 31, 2002

(51) Int. Cl.[7] .................................................. G06F 17/60

(52) U.S. Cl. ........................................ 235/386; 235/375

(58) Field of Search ......................... 235/386, 51, 50 A, 235/50 B, 59 A, 55 E, 56, 57, 434; 707/10, 539; 700/82

(56) References Cited

U.S. PATENT DOCUMENTS 3,654,603 A * 4/1972 Gunning et al. ................ 714/4
6,002,970 A * 12/1999 Abdelnour et al. ........... 700/82

FOREIGN PATENT DOCUMENTS

JP 2001223629 A * 8/2001
JP 2002163414 A * 6/2002

* cited by examiner

*Primary Examiner*—Thien M. Le
*Assistant Examiner*—Kimberly D. Nguyen
(74) *Attorney, Agent, or Firm*—Guido Modiano; Albert Josif; Daniel O'Byrne

(57) ABSTRACT

A method for collecting data from electronic voting units standing by to receive enabling commands, comprising: sending in parallel a vote opening/control command from a central logic unit to a plurality of peripheral logic units by way of first connection elements and to voting units by way of second connection elements; storing the vote in the voting unit if the vote opening/control command is a vote opening command; setting the voting units to the stored vote sending mode; sending in succession, from each individual peripheral logic unit, a vote collection command; sending to the peripheral logic units a vote signal from each one of the voting units in a preset time interval; and transmitting the votes collected by the peripheral logic units to the central logic unit and to a computer.

9 Claims, 4 Drawing Sheets

FLOW CHART ULC, ULP

INDIVIDUAL VOTING UNIT FLOWCHART

METHOD FOR COLLECTING DATA FROM ELECTRONIC VOTING UNITS

BACKGROUND OF THE INVENTION

The present invention relates to a method for collecting data from electronic voting units.

Systems and methods that manage electronic voting units are already known.

These methods are currently able to manage accurately a very limited number of voting units, since they use a single data exchange unit to receive the votes. The trivial solution is to increase the transmission and reception power in order to be able to extend the number of votes collected. However, in every country the law sets limits to emissions, and therefore the area covered by the individual exchange unit has the physical limitation of emission power.

SUMMARY OF THE INVENTION

The aim of the present invention is to provide a method that allows to obviate the above mentioned drawbacks while keeping at minimal levels the irradiated power and the consequent electromagnetic pollution.

Within this aim, an object of the present invention is also to reduce vote collection time and achieve high accuracy.

Another object is to cover a vast area for querying the voting units.

Another object is to provide a method that achieves the above aim and objects in a manner that is simple, relatively easy to provide in practice, safe in use, effective in operation, and has a relatively low cost.

This aim and these and other objects which will become better apparent hereinafter, are achieved by the present method for collecting data from electronic voting units which are standing by to receive enabling commands, characterized in that it comprises the steps of:

- sending a vote opening/control command from a central logic unit to a plurality of peripheral logic units by way of first connection means;
- sending said vote opening/control command to a plurality of voting units set to simultaneous reception by way of second connection means;
- storing the vote in said voting unit if said command is a vote opening command;
- setting said voting units to the mode for sending the stored vote;
- sending in succession, from each individual peripheral logic unit, a vote collection command for blocks of voting units or individual voting units;
- sending to said peripheral logic units a vote signal, in response to said vote collection command, from each one of said voting units in a preset time interval;
- transmitting the votes collected by said peripheral logic units to said central logic unit;
- transmitting the votes collected in the voting session to a computer.

BRIEF DESCRIPTION OF THE DRAWINGS

Further characteristics and advantages will become better apparent from the following detailed description of a preferred but not exclusive embodiment of a method for collecting data from electronic voting units according to the present invention, illustrated only by way of non-limitative example in the accompanying drawings, wherein.

DESCRIPTION OF THE PREFERRED EMBODIMENTS

Figure 1:
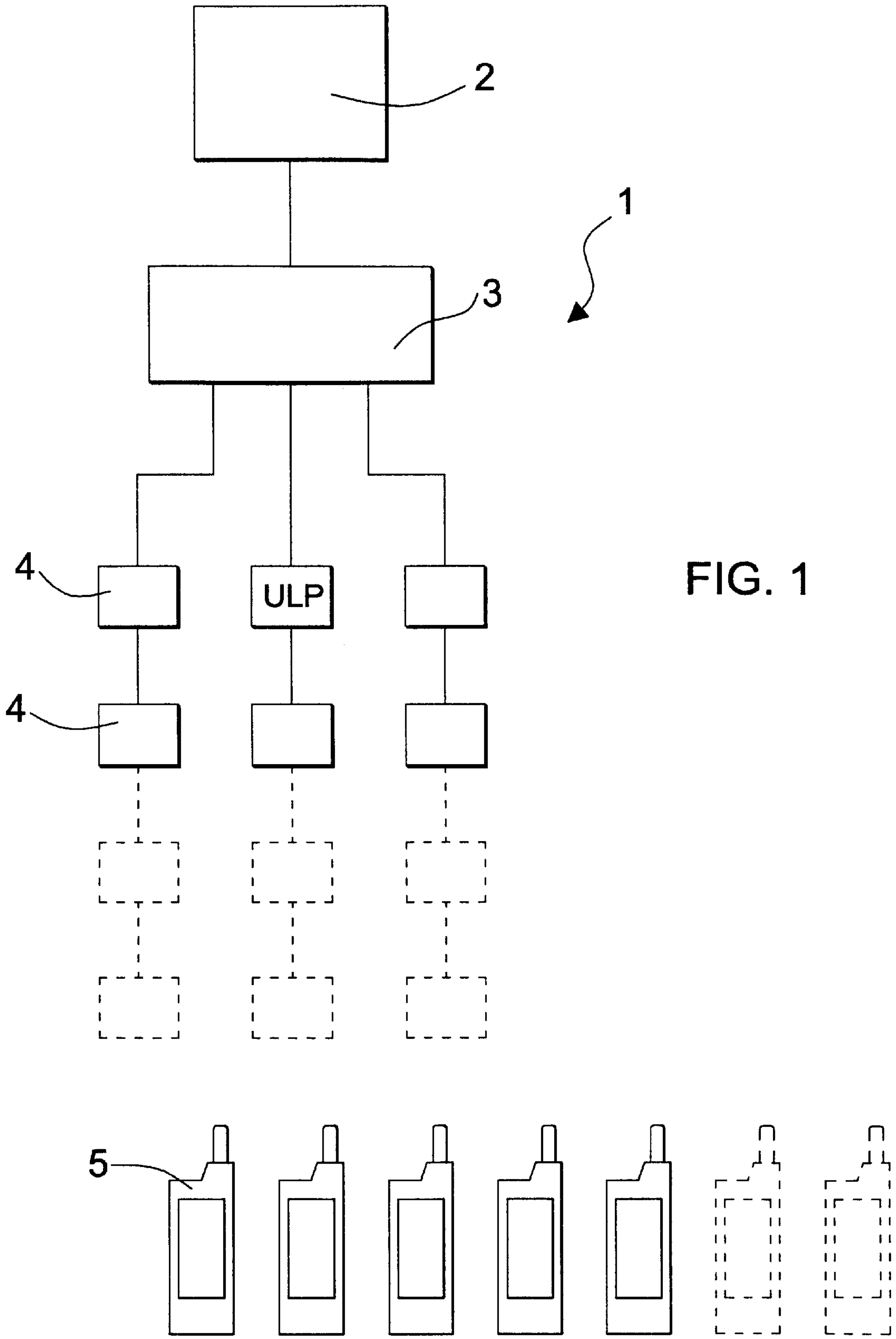
FIG. 1 is a block diagram of the components that provide a voting system according to the present invention.

With reference to the figures, the reference numeral 1 generally designates a schematic diagram of the components of the voting system according to the invention. The diagram of FIG. 1 comprises a computer 2, which is interfaced by virtue of an RS232 connection to a central logic unit 3, termed ULC, which is suitable to be driven by the computer 2 for the provision of enabling commands. The ULC 3 is connected in parallel by way of first connection means of the RS485 or radio type to a plurality of peripheral logic units 4, termed ULP, which are suitable to drive a given number of voting units 5 clustered in blocks 6 according to a common identification address for the block 6. For example, it is possible to provide 16384 voting units 5 interfaced with the ULC 2 by virtue of 32 ULP 4. In this case, the voting units 5 are divided into 16 blocks, each of which clusters 1024 to which multiple ULP 4 are connected.

Figure 2:
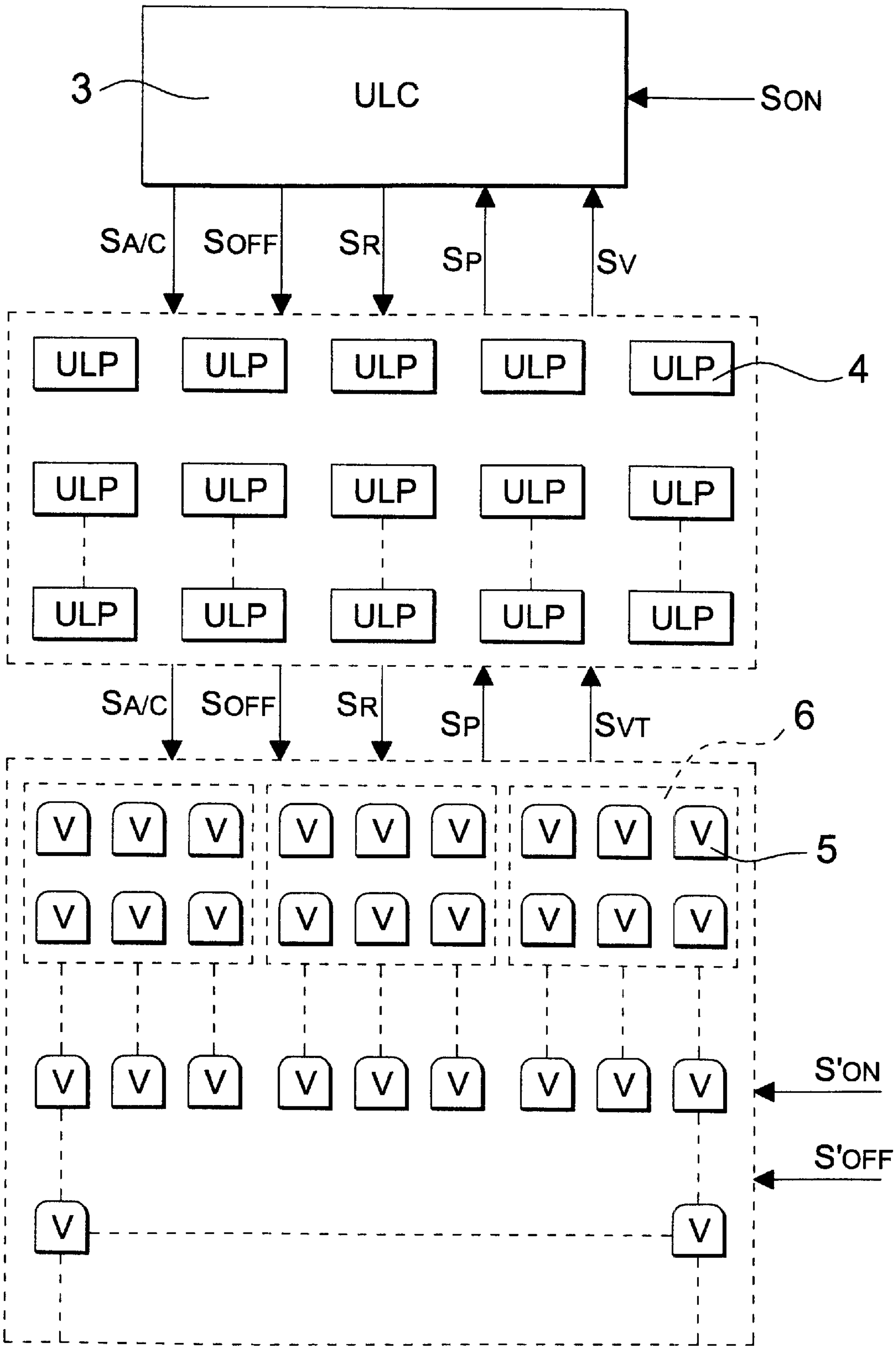
FIG. 2 is a block diagram of the method according to the present invention.
Figure 3:
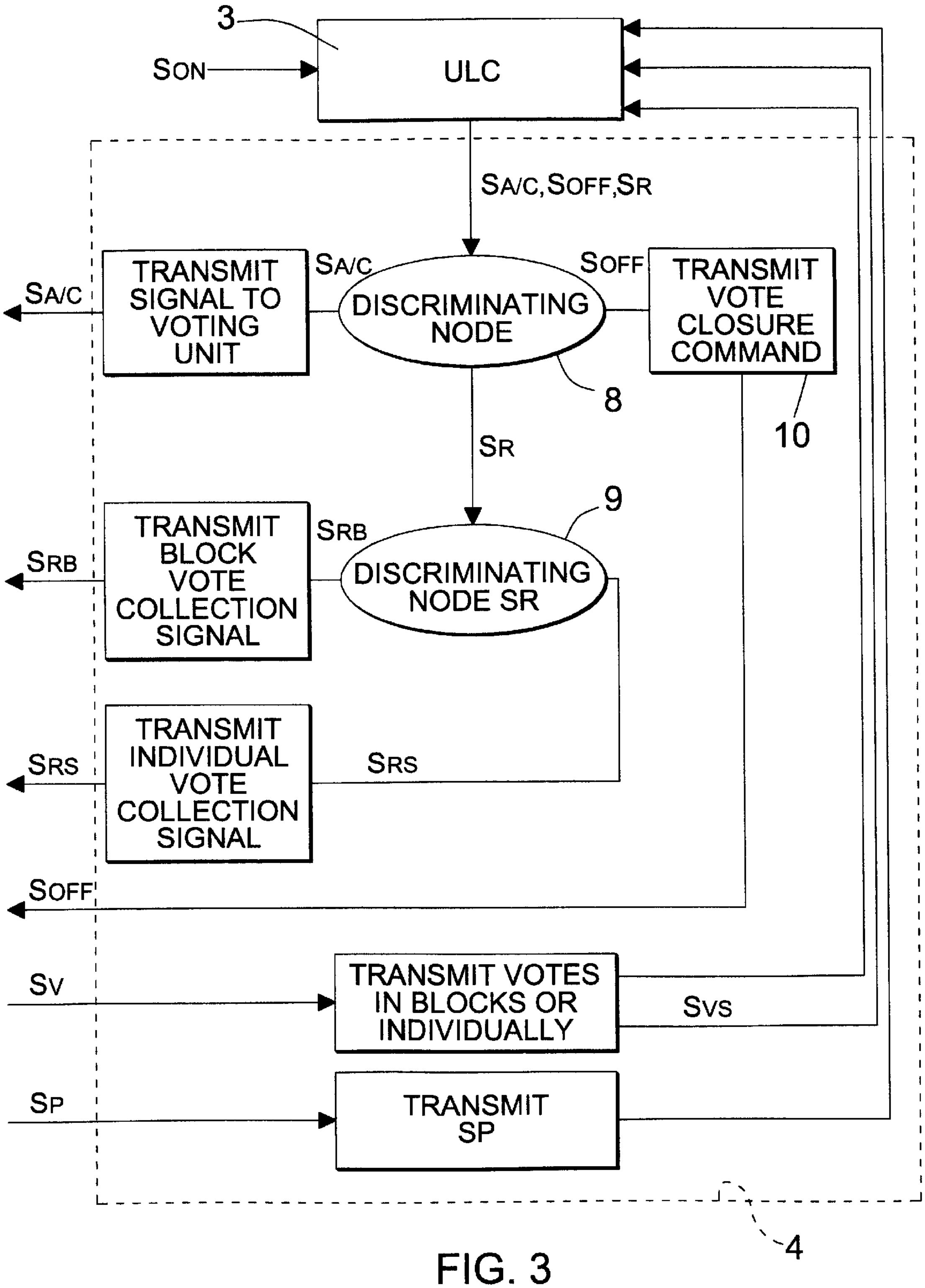
FIG. 3 is a flowchart of the central and peripheral logic units.

The ULC 3, as shown in FIGS. 2 and 3, receives from the computer 2 a power-on signal $S_{ON}$. At this point, the ULC 3, on command from the computer 2, sends enabling commands in parallel to each ULP 4. If the enabling commands consist of a signal $S_{A/C}$ for vote opening control, such signal is transmitted, by way of a discriminating node 8, to the voting units 5. If instead the enabling command is a vote collection command $S_R$, it is sent by virtue of the discriminating node 8 to the discriminating node 9, where the command is divided into two commands $S_{RB}$ and $S_{RS}$. The command $S_{RB}$ is a block collection command and is sent to all the voting units 5, while $S_{RS}$ is an individual collection command and is sent to the individual voting unit 5. Finally, if the enabling command is a command $S_{OFF}$, it is sent by virtue of the discriminating node 8 and the node 10 to the voting unit 5.

Figure 4:
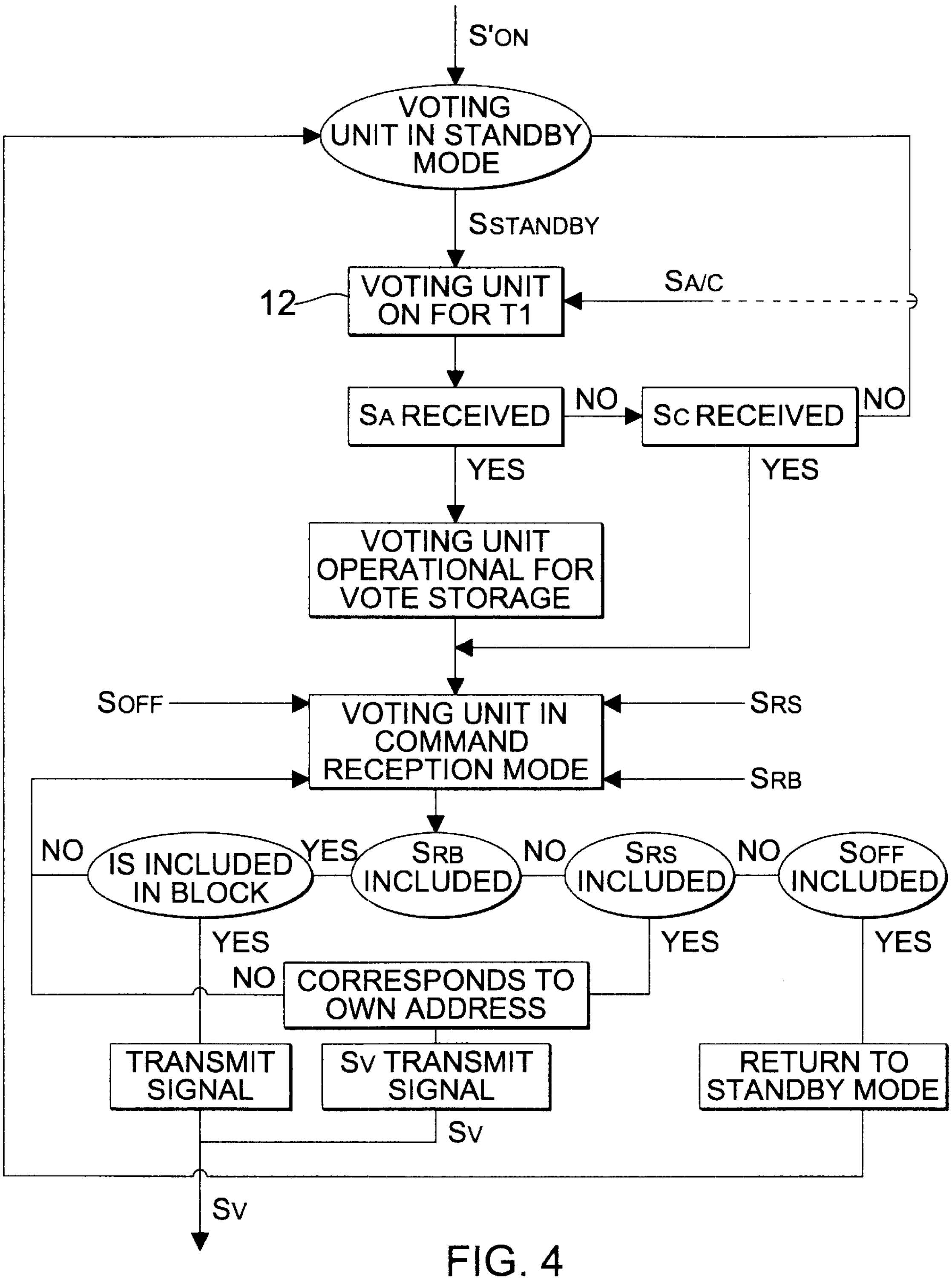
FIG. 4 is a flowchart of an individual voting unit.

The voting unit 5, as shown in FIG. 4, receives in input a signal $S'_{ON}$ by virtue of a button located on the keypad, thus setting itself in the standby mode. In the standby mode, the voting unit 5 sends to a node 12 a standby signal $S_{standby}$, which keeps the voting unit 5 in standby for a time TON during which it can receive the command $S_{A/C}$. If the command $S_{A/C}$ is a vote opening command $S_A$, then an LED lights up on the keypad of the voting unit 5 and indicates to the holder of the voting unit 5 that he is to give his vote. At this point, the vote is stored in an internal memory of the voting unit 5. If the command $S_{A/C}$ is a control command $S_C$, then the voting unit 5 enters a command reception mode.

After storing the vote, the generic voting unit 5 can receive a block vote collection command $S_{RB}$. At this point, if the voting unit 5 is included in the block 6, it transmits a signal $S_V$ of the stored vote to the ULP 4 within a certain period of time that depends on which ULP received the command and on the position of the voting unit 5 in the block 6. If instead the command is a command $S_{RS}$ that corresponds to the address of the voting unit 5, a signal $S_V$ of the stored vote is transmitted to the corresponding ULP 4. Finally, if the command is $S_{OFF}$, the voting unit 5 returns to the standby mode and the vote is closed. At this point, each ULP 4 transmits sequentially to the ULC 3 the collected preferences.

It is thus evident that the invention achieves the intended aim and objects.

In particular, the fact is stressed that the placement of the ULPs 4 in multiple locations allows to cover a wide area by using low power levels and short times, since signal transmission and reception occurs substantially simultaneously.

The invention thus conceived is susceptible of numerous modifications and variations, all of which are within the scope of the appended claims.

All the details may further be replaced with other technically equivalent ones.

The disclosures in Italian Patent Application No. BO2001A000251 from which this application claims priority are incorporated herein by reference.

What is claimed is:

1. A method for collecting data from electronic voting units which are standing by to receive enabling commands, comprising the steps of:

sending in parallel a vote opening/control command from a central logic unit to a plurality of peripheral logic units by way of first connection means;

sending said vote opening/control command to a plurality of voting units set to simultaneous reception by way of second connection means;

storing a vote in said voting unit if said vote opening/control command is a vote opening command;

setting said voting units to a mode for sending the stored vote;

sending in succession, from each individual peripheral logic unit, a vote collection command for blocks of said voting units or individual voting units;

sending to said peripheral logic units a vote signal, in response to said vote collection command, from each one of said voting units in a preset time interval;

transmitting the votes collected by said peripheral logic units to said central logic unit; and transmitting the votes collected in the voting session to a computer.

2. The method according to claim 1, wherein said central logic unit is interfaced with the outside environment by virtue of said computer suitable to drive said central logic unit in order to provide said vote opening/control commands and vote collection commands.

3. The method according to claim 1, wherein said voting units remain in standby mode if they receive a signal other than said vote opening/control command.

4. The method according to claim 1, wherein each one of said blocks comprises a predefined number of voting units that share a block address.

5. The method according to claim 1, wherein said vote collection command is a block command or an individual command.

6. The method according to claim 1, wherein said preset time interval depends on the peripheral logic unit from which said voting unit has received said collection command and on the position occupied by the voting unit in the block to which it belongs.

7. The method according to claim 1, wherein said vote collection command is of the block type, said collection command is sent by virtue of the peripheral logic units to each voting unit.

8. The method according to claim 5, wherein said vote collection command is individual said command is sent by virtue of the peripheral logic units to the corresponding voting unit.

9. The method according to claim 1, wherein said peripheral logic unit is a transmission and reception antenna.

* * * * *

UNITED STATES PATENT AND TRADEMARK OFFICE

CERTIFICATE OF CORRECTION

PATENT NO. : 6,607,126 B2
DATED : August 19, 2003
INVENTOR(S) : Giovanni Altini et al.

It is certified that error appears in the above-identified patent and that said Letters Patent is hereby corrected as shown below:

Title page,
Item [30], should read:
-- [30] Foreign Application Priority Data
April 26, 2001 (IT) ……………………….. BO2001A000251 --

Signed and Sealed this

Twentieth Day of January, 2004

JON W. DUDAS
*Acting Director of the United States Patent and Trademark Office*